United States Patent [19]

Goldhar et al.

[11] Patent Number: 4,615,588

[45] Date of Patent: Oct. 7, 1986

[54] TRANSPARENT ELECTRODE FOR OPTICAL SWITCH

[75] Inventors: Julius Goldhar, San Ramon; Mark A. Henesian, Livermore, both of Calif.

[73] Assignee: The United States of America as represented by the United States Department of Energy, Washington, D.C.

[21] Appl. No.: 662,641

[22] Filed: Oct. 19, 1984

[51] Int. Cl.⁴ .......................... G02F 1/03; H01J 15/00
[52] U.S. Cl. .............................. 350/392; 313/231.31; 350/393
[58] Field of Search .................... 350/391–393, 350/356; 333/99 PL; 328/76, 80; 372/12; 313/231.31, 231.41, 231.51, 231.61, 514, 311; 315/111.21, 349–351

[56] References Cited

U.S. PATENT DOCUMENTS

| | | | |
|---|---|---|---|
| 2,873,400 | 2/1959 | Cook | 313/231.31 |
| 3,393,956 | 7/1968 | Clark | 350/356 |
| 3,774,063 | 11/1973 | Beiser et al. | 313/73 |
| 3,784,928 | 1/1974 | Crane | 313/217 |
| 3,995,189 | 11/1976 | Haslund | 372/103 |
| 4,087,764 | 5/1978 | Young | 372/20 |
| 4,331,939 | 5/1982 | Kuwabara et al. | 372/98 |
| 4,442,383 | 4/1984 | Hill | 313/231.41 |

OTHER PUBLICATIONS

Nicholson et al, "Kerr-Cell Shutter Has Submicrosecond Speed" *Electronics*, 6-1955, pp. 171-173.
Hyde et al, "A Laser-Triggered Krytron-Blumlein Electro-Optic Switch", *Jr. of Physics*, E: Scientific Instru, 11-1977, pp. 1106-1107.
Arams, F. R., "Microwave Applictions", *Electronics*, 11-1954, pp. 168-172.

Primary Examiner—William H. Punter
Attorney, Agent, or Firm—Henry P. Sartorio; Clifton E. Clouse, Jr.; Judson R. Hightower

[57] ABSTRACT

A low pressure gas electrode utilizing ionized gas in a glow discharge regime forms a transparent electrode for electro-optical switches. The transparent electrode comprises a low pressure gas region on both sides of the crystal. When the gas is ionized, e.g., by a glow discharge in the low pressure gas, the plasma formed is a good conductor. The gas electrode acts as a highly uniform conducting electrode. Since the plasma is transparent to a high energy laser beam passing through the crystal, the electrode is a transparent electrode. A crystal exposed from two sides to such a plasma can be charged up uniformly to any desired voltage. The plasma can be created either by the main high voltage pulser used to charge up the crystal or by auxiliary discharges or external sources of ionization. A typical configuration utilizes 10 torr argon in the discharge region adjacent to each crystal face.

21 Claims, 2 Drawing Figures

TRANSPARENT ELECTRODE FOR OPTICAL SWITCH

BACKGROUND OF THE INVENTION

The United States Government has rights in this invention pursuant to Contract No. W-7405-ENG-48 between the U.S. Department of Energy and the University of California, for the operation of Lawrence Livermore National Laboratory.

The invention relates generally to optical switches and techniques for applying a voltage to an electro-optical crystal, and more particularly, to transparent electrodes for an optical switch.

System architectures for very large inertial confinement fusion (ICF) lasers require active optical elements with apertures on the order of one meter. Large aperture optical switches are needed for isolation of stages, switch-out from regenerative amplifier cavities and protection from target retroreflections. In operation it is necessary to apply a voltage uniformly to the crystal faces. No conventional optical switch technology is scalable to such large apertures. Pockels cells conventionally utilize coaxial ring electrodes but Pockels cells with ring electrodes require crystal thickness comparable to the aperture. Thin crystal Pockels cell designs using transparent conducting metallic films or liquid layers have also been proposed, but have unacceptable resistivity at large apertures or are not appropriate for use with high intensity laser beams. Other potential approaches include fast Faraday rotators or transient volumetric thermal gratings, but these are still undeveloped.

A thin crystal can be used to construct a longitudinal Pockels cell if one has transparent electrodes which apply a uniform electric field along the crystal optical axis coincident with the propagation direction of the laser beam. Thin crystals are also required for efficient second harmonic generation with ICF lasers, and a longitudinal configuration with transparent electrodes can be utilized for an electro-optically tuned second harmonic switch.

Accordingly, it is an object of the invention to provide a transparent electrode for an optical switch for applying a voltage to an electro-optical crystal.

It is also an object of the invention to provide transparent electrodes for optical switches having apertures of one meter or greater.

It is a further object of the invention to provide a transparent electrode for a large aperture Pockels cell.

It is another object of the invention to provide a transparent electrode for an electro-optically tuned frequency conversion crystal.

SUMMARY OF THE INVENTION

The invention is a transparent plasma electrode formed in low pressure ionized gas. An electro-optical material is exposed to a glow discharge plasma on each face. The plasma can be created either by a main high voltage pulser used to charge up the crystal or by auxiliary discharges or external sources of ionization. The plasma acts as a transparent conductive coating allowing uniform charging of each surface to the required potential. The invention can be used to construct high aspect ratio electro-optic cells including Pockels cells using linear electro-optic effects in crystals, electro-optically tuned second harmonic generation cells and quasi-transverse Kerr cells with quadratic electro-optic liquids, glasses, ceramics or crystals.

DETAILED DESCRIPTION OF THE PREFERRED EMBODIMENT

Figure 1:
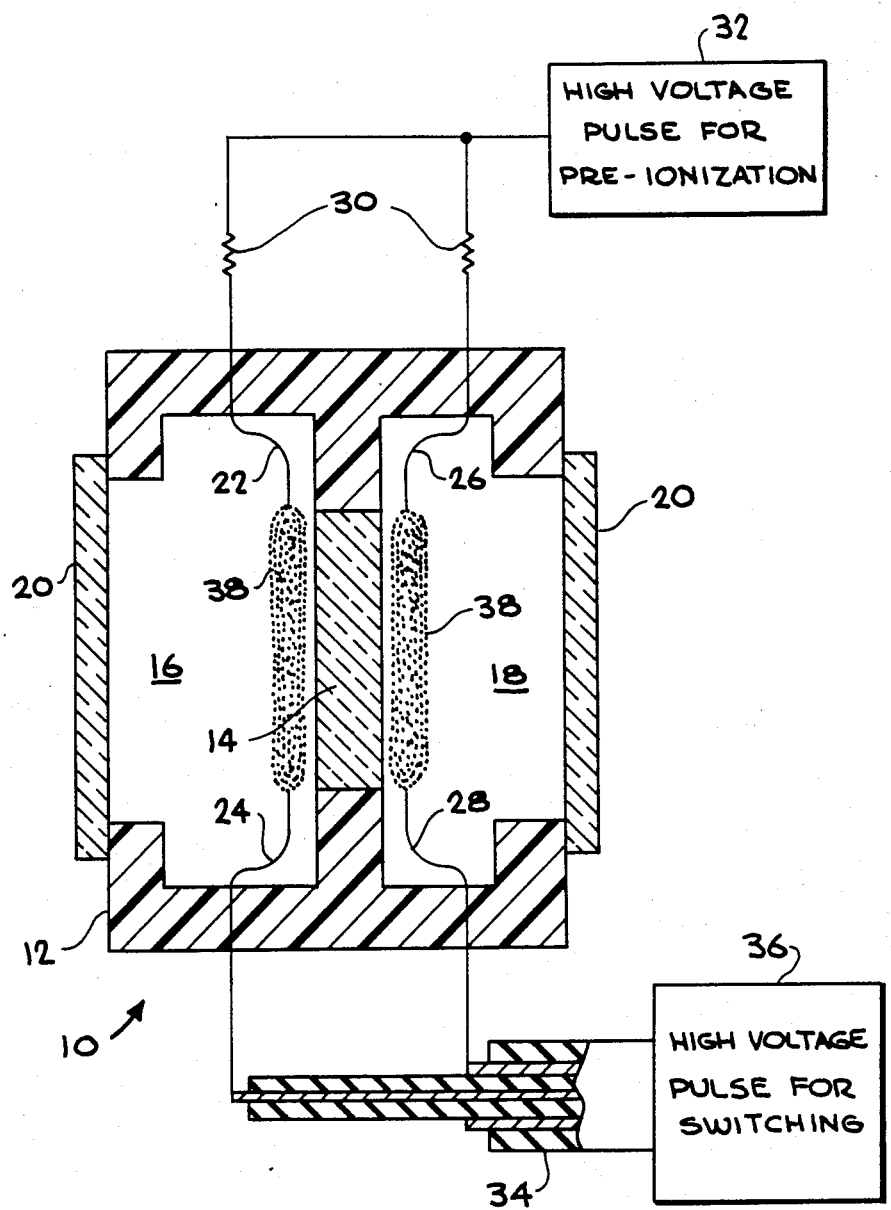
FIG. 1 is a sectional view of a Pockels type cell with plasma electrodes for applying a voltage to a crystal.

A preferred embodiment for Pockels type cells with plasma electrodes is illustrated in FIG. 1. A pair of electrodes on each side of the crystal is used to establish the initial sheets of glow discharge in low pressure gas covering the entire optical aperture. Since the current flows parallel to the crystal, no electric field is applied along the optical axis and the pre-ionization current does not affect the polarization of the transmitted optical beam. One pair of electrodes can then be used at a later time, once the desired plasma conditions are established, to charge up the crystal to the required voltage. This four electrode design allows one to establish the initial plasma conditions independently of the voltage pulse requirements for electro-optic switching.

A Pockels cell 10, as shown in FIG. 1, comprises a hollow cell body 12, e.g., made of lucite, and a KDP crystal 14 mounted within the cell body 12 which divides the interior of cell body 12 into two separate chambers 16 and 18. Optical windows 20, e.g., fused silica, are mounted over openings in opposite ends of the cell body 12 at ends of the chambers 16 and 18 and are aligned with the crystal 14 so that a laser beam may pass through the windows 20 and through the chambers 16, 18 and the crystal 14. The laser beam is generally incident normal to crystal 14.

One pair of electrodes 22, 24 are mounted in the chamber 16, close to the surface of crystal 14 and near opposed edges of the crystal 14. A second pair of electrodes 26, 28 are similarly mounted in chamber 18. The two electrodes 22, 26 near one edge of crystal 14 extend tnrough body 12, e.g., through feedthroughs, and are connected through ballast resistors 30 to a pre-ionization voltage source 32. The other two electrodes 24, 28 extend through body 12 and are connected by means of coaxial cell 34 to a high voltage supply 36.

The chambers 16 and 18 are filled with a low pressure gas, e.g., argon, helium, neon or mixtures thereof, preferably at a pressure of about 10 torr or less. In operation, a pre-ionization voltage pulse from source 32 is applied across electrodes 22-24 and across 26-28, to produce a conducting plasma region 38 adjacent to the faces of crystal 14. After the plasma region 38 has been produced, a high voltage pulse from source 36 is applied to electrodes 24 and 28. Because of the conductivity of the plasma region 38 the voltage applied across electrodes 24, 28 will be applied to the crystal 14, providing uniform charging of the crystal surfaces.

The four electrode geometry is one preferred embodiment for creating the plasma electrodes and for applying the switching voltage. Pairs of electrodes 22-24, 26-28 on each side of the crystal 14 are used to establish plasma 38 in both chambers 16, 18, with minimum voltage applied across the crystal. Following pre-ionization, the main switching pulse is applied to a pair of electrodes 24, 28 on the opposing sides of the crystal. The voltage pulse charges-up the crystal faces using the plasma 38 as conducting electrodes. For more uniform pre-ionization with a large crystal, electrodes 22, 26 on each side of the crystal may be segmented and the electrode segments individually ballasted.

Unlike the metallic film or liquid conductors, a plasma is a very nonlinear medium and there are regimes of operation which are highly undesirable. For example, with insufficient pre-ionization, a large jitter in switching time is observed, and copious amounts of r.f. radiation are generated by the cell. At moderate pre-ionization levels plasma resistance is a function of switching voltage and very slow optical rise times are observed for low voltages. However, proper choice of operating parameters with this geometry allows one to obtain rise times in the nanosecond regime and with no observable jitter.

A Pockels cell of the design illustrated in FIG. 1 was constructed and tested. A KD*P (90% deuterated KDP) crystal 1 cm thick and with an aperture of 5×5 cm$^2$ was potted into a plexiglass holder with a two-part silicone elastomer. The chamber body was constructed from lucite. The two sections were evaluated and filled with gas; typical fill pressure was 10 Torr of helium.

Figure 2:
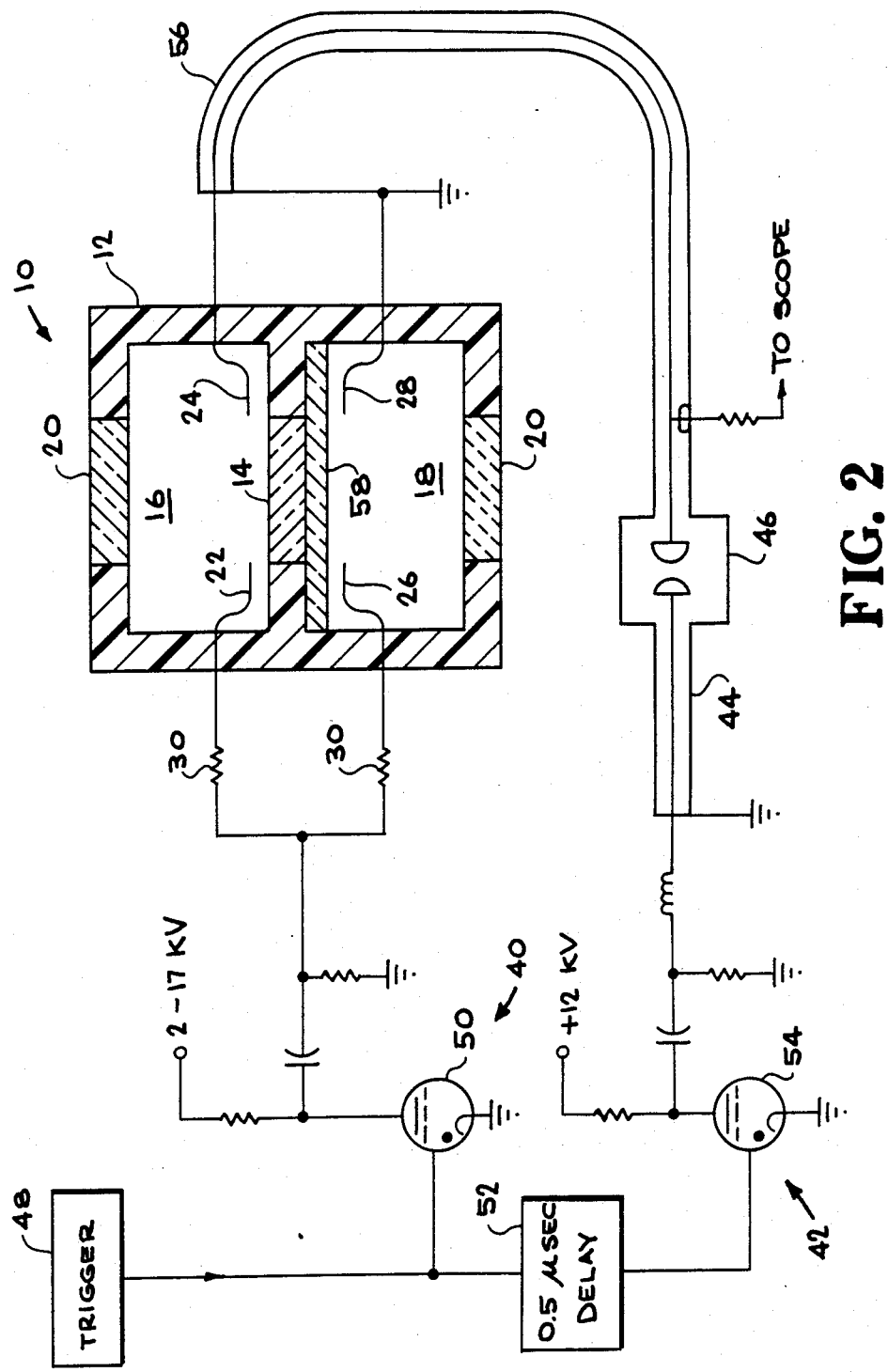
FIG. 2 is a schematic view of an electrical circuit for forming the plasma electrodes and applying a voltage.

An electrical circuit used to pulse the cell is shown in FIG. 2. Two separate thyratron switched pulsers 40 and 42 are used, one (40) to provide the pre-ionization voltage, and the other (42), to provide the electro-optic switching pulse. The switching pulse is derived from a pulse charged cable 44 and a selftriggered low inductance spark-gap 46. High voltage pulser 40 is connected through ballast resistor 30 to electrodes 22, 26 mounted in chambers 16, 18, respectively of cell 10. The electrodes 22, 26 are adjacent to one end of crystal 14 mounted in the body 12 of cell 10. A trigger pulse from trigger 48 switches the thyratron 50 in pulser 40 to apply a pre-ionization high voltage pulse to electrodes 22, 26. The preionization pulse establishes a glow discharge between electrodes 22 and 24 and between electrodes 26 and 28 when the chambers 16, 18 are filled with a low pressure gas, i.e., a sheet of conductive plasma 38 is produced adjacent each face of crystal 14. The trigger pulse from trigger 48 is also delayed by delay means 52 and switches thyratron 54 in pulser 42 to apply a high voltage pulse to charge line or cable 44. Cable 44 is connected through spark-gap 46 to delay line 56 which is connected to electrodes 24, 28 in cell 10. The high voltage pulse from pulser 42 is applied after the conducting plasma has been produced between electrodes 22-24 and 26-28 because of delay means 52 and delay line 56 so that the high voltage applied between electrodes 24-28 is conducted to the surfaces of crystal 14.

In one particular embodiment, pulser 40 has a variable 2 to 17 kV voltage and ballast resistors 30 are 500Ω and pulser 42 has a voltage of 12 kV. The trigger signal is delayed 0.5 μs between thyratrons 50 and 54 by delay means 52. Pulser 42 is connected to a 12 ns charge line 44 which is connected to one electrode of spark-gap 46. The other electrode of spark-gap 46 is connected to a 100 ns delay line 56 which is connected to electrodes 24, 28. The voltage from pulser 42 is input to line 44 which triggers spark-gap 46, thereby applying the voltage to line 56. A spark-gap 46 spacing of about 0.5 mm with rounded tungsten electrodes, with about 40 psi of compressed air gives good pulse-steepening performance. Voltage pulses of about 1 ns rise time and 25 ns duration at about 20 kV are delivered to the Pockels cell 10 via a 100 ns delay line 56. The cell is operated as a high impedance load, and thus a voltage doubling of the charged cable 44 voltage occurs at the cell. Somewhat faster turn on times could be obtained if a high voltage pulser 42 of twice the voltage is used and the cell is shunted with a 50Ω load. The pre-ionization current is adjusted by varying the pre-ionization voltage of pulser 40 from 2.5 to 17 kV and by changing the ballast resistors 30.

In one application of the plasma electrode, a Pockels cell is used as an optical switch; the cell is placed between a polarizer and analyzer aligned orthogonal to each other and normal to the optical axis through the crystal. In this longitudinal electro-optic configuration, no light is transmitted through the switch when there is a zero potential difference between the crystal faces. For an instantaneous voltage V(t) across the crystal, the optical transmission through the analyzer is related to the voltage across the crystal by $T(t)=\sin^2[\pi V(t)/2V_\pi]$ where $V_\pi$ is the voltage for half wave retardation between waves polarized along the fast and slow electro-optical axes. The voltage V(t) is applied to the crystal as previously described using the plasma electrodes.

For a Pockels cell, the crystal is typically KDP or KD*P (90% deuterated KDP). The crystal may optionally have an anti-reflection coated glass plate adjacent to each crystal surface with index matching fluid at the interfaces. The optical windows in the cell are typically fused silica. Pockels cell performance is improved by placing a fused silica plate 58 (shown in FIG. 2), e.g., 2.5 mm thick, in series with the crystal. Plate 58 is glued to one crystal face with a transparent silicone elastomer. The low dielectric constant of plate 58 relative to the crystal results in most of the voltage drop across plate 58, raising the effective half-wave voltage and reducing the capacitance of the plate-crystal.

The plasma electrode concept is ideally suited to the construction of Pockels cells with apertures greater than 5 cm. Plasma sheet electrodes generated in the four-electrode design apply a uniform electric field over virtually the entire face of the crystal, and thus allow thin crystals to be used. Conventional ring-electrode Pockels cells are commercially available up to 10 cm in diameter, but require about 950 cm$^3$ of single crystal material, have a limited contrast ratio of about 200:1, and a high single-pass loss of about 7%. Thin crystal plasma electrode Pockels cells of 10 cm diameter aperture require less than 160 cm$^3$ of crystal material, should have a contrast ratio of greater than 500:1 and single pass loss of less than 2%. For high intensity laser applications, thin crystal plasma electrode Pockels cells will also have the advantage of substantially lower (by a factor of 5) beam break-up parameter compared to conventional designs. In general, a thick crystal will give proportionately narrower acceptance angles which may be critical for some applications. Thus, many important performance improvements are provided by the plasma electrode concept at large aperture.

A longitudinal Pockels cell with a clear aperture of 26×26 cm was constructed using a Z-cut KDP crystal of 27×27×1.1 cm dimensions. Both the bare crystal and the configuration with the crystal sandwiched between 6 mm glass plates with 1 mm gaps filled with index-matching fluid were tested. Transparent plasma electrodes formed in a low pressure glow discharge in 5-10 torr helium were used to apply a uniform electric field to the crystal. A 1 μs duration 30 kV pre-ionization pulse breaks down the gas to form the plasma, and after a 200 ns delay, triggers the main switching pulser. A 50 ns length of transmission line at 25Ω impedance couples the main pulser to the Pockels cell. The driving line is terminated at the cell with a 10Ω load for the bare crystal and a 25Ω load for the sandwich configuration. The ballast resistor for each pre-ionization electrode is 250Ω. Optical switching times of 50 ns were achieved with the bare crystal. The sandwich configuration increases the half-wave voltage and decreases capacitance so switching times comparable to the electromagnetic propagation time across the crystal are obtainable.

Another application of the plasma electrode is for an electro-optical switch based on voltage-tuned second harmonic generation. In this switch concept transparent electrodes apply a uniform electric field to a harmonic generation crystal in the direction of propagation of the fundamental and harmonic light. The effect of the field is to alter the ordinary and extraordinary ray phase velocities and thus change the phase-matching of the harmonic-field to the driving polarization. Thus, the voltage applied to the transparent electrodes can tune the efficiency of conversion from the fundamental to harmonic wavelength. Transparent plasma electrodes are ideal in the longitudinal electro-optic configuration with angle-phase matched harmonic crystals, as the voltage required to tune the phase-matching is independent of crystal length. Thus, the efficiency of the harmonic generation process can be independently optimized. The voltage required to tune the harmonic generation depends specifically on the crystal cut and the values of the relevant electro-optic coefficients. For example, type I or modified type 11 KDP crystal may be utilized. A dichroic mirror which reflects the fundamental frequency but transmits the second harmonic is placed at one end of the harmonic crystal cell. For example, in the configuration of FIG. 1, crystal 14 could be a frequency conversion crystal and window 20 a dichroic mirror. The frequency conversion switch is actuated by ionizing the plasma electrodes and applying a voltage to the harmonic crystal when the frequency converted output is desired. A voltage may be similarly applied using the plasma electrodes to a harmonic generation crystal to spoil the phase-matching condition to prevent harmonic conversion. Upon removing the voltage, e.g., by grounding the discharge or by applying a reverse polarity voltage pulse to the electrodes, the phase-matching condition may be re-established thereby allowing frequency conversion and transmission through the dichroic mirror.

An important application of a large aperture electro-optic harmonic switch would be to provide switch-out from a high power regenerative or multi-pass amplifier. If the amplifying laser medium is Nd:glass then a 1.06 $\mu$m wavelength laser pulse is injected into the multi-pass cavity, for example, through a partially transmitting cavity end mirror. After the injected 1.06 $\mu$m light pulse has been amplified by repetitive (two to five) passes through the amplifier, it is switched-out of the cavity by electro-optic harmonic conversion. Just prior to switch-out time, a pulsed electric field turns on the phase-matching condition for harmonic conversion. The amplified fundamental light is then converted to the second harmonic during its passage through the crystal, and leaves the cavity by transmission through a dichroic end mirror. For type I second harmonic generation, the polarizations of the 1.06 $\mu$m and 0.53 $\mu$m beams are orthogonal so reflection from a polarizer can also be used for switch-out. The electric field may also be used initially to de-tune the crystal and then be grounded by an opposite polarity voltage pulse at the switch-out time so that efficient harmonic conversion may occur. With plasma electrodes, the technique is then scalable to the large amplifier apertures required in many high power laser applications such as inertial confinement fusion.

Another application of the plasma electrode is to optical switches utilizing quadratic electro-optic effects. In the quasi-transverse configuration with plasma electrodes the electro-optic material is tilted at an angle with respect to the laser beam and the component of the applied electric field in the material transverse to the beam direction induces the electro-optic effect. In the configuration of FIG. 1, the electro-optic crystal 14 may be made from any material including crystal, glass, liquid or ceramic which exhibits the quadratic electro-optic effect.

Changes and modifications in the specifically described embodiments can be carried out without departing from the scope of the invention which is intended to be limited only by the scope of the appended claims.

We claim:

1. A transparent electrode assembly for applying an electric field through an electro-optic crystal comprising:
    a pair of regions of low pressure gas adjacent the crystal at opposing faces through which an optical beam is propagated through the crystal;
    means operatively connected to the regions of low pressure gas to ionize the gas to produce an optically transparent conducting plasma adjacent to the faces of the crystal;
    means operatively connected to the regions to apply an electrical potential across the pair of plasma regions.

2. The electrode of claim 1 wherein the gas is at a pressure of about 10 torr or less.

3. The electrode of claim 1 wherein the gas is selected from argon, helium, neon or mixtures thereof.

4. The electrode of claim 2 wherein the gas is selected from argon, helium, neon or mixtures thereof.

5. An electro-optic switch, comprising:
    a hollow body;
    an electro-optic crystal mounted in the body and dividing the body into two chambers;
    a pair of transparent windows mounted to the body and aligned with the crystal to allow a light beam to be transmitted through the body and the crystal;
    a plurality of electrodes extending through the body into the two chambers;
    a low pressure gas filling the two chambers;
    ionization means connected to the electrodes to ionize the gas and produce a sheet of conducting plasma adjacent the crystal;
    high voltage means connected to the electrodes to apply a high voltage through the conducting plasma to the crystal.

6. The switch of claim 5 wherein the gas is at a pressure of about 10 torr or less.

7. The switch of claim 6 wherein the gas is selected from argon, helium, neon or mixtures thereof.

8. The switch of claim 5 wherein the plurality of electrodes includes a pair of electrodes disposed in each chamber, the ionization means being connected across each pair.

9. The switch of claim 8 wherein the high voltage means are connected to one electrode of each pair.

10. The switch of claim 9 wherein the ionization means and high voltage means are a pair of thyratron switched high voltage pulsers.

11. A method of switching an optical beam by means of an electro-optic crystal, comprising:
producing a sheet of optically transparent conducting plasma adjacent a face of the crystal;
applying a voltage to the plasma to apply an electric field to the crystal;
directing the optical beam through the plasma to the crystal.

12. The method of claim 11 wherein the plasma is produced by ionizing a low pressure gas.

13. The method of claim 12 wherein the plasma is produced by ionizing a gas at a pressure of about 10 torr or less.

14. The method of claim 13 wherein the plasma is produced by ionizing a gas selected from argon, helium, neon or mixtures thereof.

15. A Pockels cell switch according to claim 8 wherein the crystal is a KDP or KD*P (90% deuterated KDP) crystal.

16. The Pockels cell switch of claim 15 further including a fused silica plate mounted to one face of the crystal.

17. A voltage tuned frequency conversion switch according to claim 8 wherein the crystal is a harmonic generation crystal, and a voltage is applied to the crystal to tune the crystal to a condition of phase matching.

18. The voltage tuned frequency conversion crystal of claim 17 further including a dichroic mirror which reflects the fundamental frequency but transmits the second harmonic frequency placed at one end of the crystal.

19. The switch of claim 18 wherein the crystal is a type I KDP crystal.

20. The method of claim 11 for tuning a frequency conversion crystal wherein a voltage is applied to a frequency conversion crystal to produce a condition of phase matching in the crystal.

21. A Kerr cell switch of claim 5 wherein the electro-optic crystal is selected from a crystal, glass, liquid, or ceramic material exhibiting the quadratic electro-optic effect and the electro-optic crystal is tilted at an angle with respect to an incident laser beam.

* * * * *